United States Patent
Shaffer et al.

(10) Patent No.: US 10,229,676 B2
(45) Date of Patent: Mar. 12, 2019

(54) PHRASE SPOTTING SYSTEMS AND METHODS

(71) Applicant: Avaya Inc., Basking Ridge, NJ (US)

(72) Inventors: Shmuel Shaffer, Palo Alto, CA (US); Keith Ponting, Worcestershire (GB); Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/646,303

(22) Filed: Oct. 5, 2012

(65) Prior Publication Data

US 2014/0100848 A1    Apr. 10, 2014

(51) Int. Cl.
   *G10L 15/22*    (2006.01)
   *G10L 15/00*    (2013.01)
   *G10L 17/22*    (2013.01)
   *G10L 15/26*    (2006.01)
   *G10L 15/08*    (2006.01)

(52) U.S. Cl.
   CPC .............. *G10L 15/22* (2013.01); *G10L 15/00* (2013.01); *G10L 15/265* (2013.01); *G10L 17/22* (2013.01); *G10L 2015/088* (2013.01); *G10L 2015/221* (2013.01)

(58) Field of Classification Search
   CPC ......... G10L 15/00; G10L 15/04; G10L 15/08; G10L 15/18; G10L 15/1815; G10L 15/183; G10L 15/19; G10L 15/22; G10L 15/26; G10L 15/265; G10L 2015/22; G10L 17/22
   USPC ............... 704/235, 246, 251, 255, 270, 275, 704/E15.001, E15.045
   See application file for complete search history.

(56) References Cited

U.S. PATENT DOCUMENTS

| | | | |
|---|---|---|---|
| 5,774,841 A | 6/1998 | Salazar et al. | |
| 6,374,221 B1 * | 4/2002 | Haimi-Cohen | ....... G10L 15/063 704/256.1 |
| 6,535,850 B1 * | 3/2003 | Bayya | ..................... G10L 15/07 704/239 |
| 7,451,085 B2 * | 11/2008 | Rose | ....................... G10L 15/08 704/244 |

(Continued)

FOREIGN PATENT DOCUMENTS

| | | |
|---|---|---|
| CN | 1365487 | 8/2002 |
| CN | 101154379 | 4/2008 |

(Continued)

OTHER PUBLICATIONS

Reynolds, et. al, "Robust Text-Independent Speaker Identification Using Gaussian Mixture Speaker Models," IEEE Trans. on Speech and Audio Processing, Jan. 1995.*

(Continued)

*Primary Examiner* — Feng-Tzer Tzeng
(74) *Attorney, Agent, or Firm* — Sheridan Ross P.C.

(57) ABSTRACT

Methods and systems for identifying specified phrases within audio streams are provided. More particularly, a phrase is specified. An audio stream is them monitored for the phrase. In response to determining that the audio stream contains the phrase, verification from a user that the phrase was in fact included in the audio stream is requested. If such verification is received, the portion of the audio stream including the phrase is recorded. The recorded phrase can then be applied to identify future instances of the phrase in monitored audio streams.

20 Claims, 4 Drawing Sheets

(56) References Cited

U.S. PATENT DOCUMENTS

| | | | | |
|---|---|---|---|---|
| 7,904,296 | B2* | 3/2011 | Morris | G10L 15/04 704/231 |
| 8,423,363 | B2* | 4/2013 | Gupta | G10L 15/22 704/231 |
| 2002/0091526 | A1* | 7/2002 | Kiessling | G10L 15/07 704/270 |
| 2004/0199388 | A1* | 10/2004 | Armbruster | G10L 15/22 704/251 |
| 2005/0288922 | A1* | 12/2005 | Kooiman | G10L 15/22 704/208 |
| 2006/0206324 | A1 | 9/2006 | Skilling et al. | |
| 2007/0038452 | A1 | 2/2007 | Blair et al. | |
| 2007/0050188 | A1 | 3/2007 | Blair et al. | |
| 2007/0192413 | A1* | 8/2007 | Murakami | G06Q 10/107 709/204 |
| 2007/0233487 | A1* | 10/2007 | Cohen | G10L 15/065 704/255 |
| 2008/0235018 | A1* | 9/2008 | Eggen | G10L 15/26 704/251 |
| 2009/0055185 | A1* | 2/2009 | Nakade | G10L 15/30 704/257 |
| 2010/0100377 | A1* | 4/2010 | Madhavapeddi | G10L 15/22 704/235 |
| 2010/0121629 | A1 | 5/2010 | Cohen | |
| 2010/0179811 | A1* | 7/2010 | Gupta | G10L 15/22 704/235 |

FOREIGN PATENT DOCUMENTS

| | | |
|---|---|---|
| CN | 102194454 | 9/2011 |
| CN | 102316227 | 1/2012 |
| JP | 2005-215726 | 8/2005 |
| WO | WO 02/095729 | 11/2002 |

OTHER PUBLICATIONS

Dragon NaturallySpeaking http://www.nuance.com/for-individuals/by-solution/speech-recognition/index.htm.

Accent Detection and Speech Recognition for Shanghai-Accented Mandarin http://www.stanford.edu/~jurafsky/p1304.pdf.

Accent Issues in Large Vocabulary Continuous Speech Recognition (LVCSR) http://research.microsoft.com/pubs/69899/tr-2001-69.pdf.

Fast Speaker Normalization and Adaptation based on BIC for Meeting Speech Recognition http://www.ar.media.kyoto-u.ac.jp/EN/bib/intl/MIM-APSIPA11.pdf.

From Switchboard to Meetings: Development of the 2004 ICSI-SRI-UW Meeting Recognition System http://www.icsi.berkeley.edu/ftp/global/pub/speech/papers/icslp2004-meeting-system.pdf.

Extended Search Report for European Patent Application No. 13187351.5, dated Dec. 20, 2013 6 pages.

"Frequently Asked Questions," Nuance Communications, 2014, retrieved from http://www.nuance.com/for-business/by-product/dragon/product-resources/frequently-asked-questions/index.htm, 5 pages.

"SAMPA: speech assessment methods phonetic alphabet," University College London, 2005, retrieved from http://www.phon.ucl.ac.uk/home/sampa/, 4 pages.

Fulcher, "What's the Deal with Automatic Speech Recognition?" Artificial Intelligence, 2012, retrieved from http://www.cs.unm.edu/~pdevineni/papers/Fulcher.pdf, 5 pages.

Huang et al., "Accent Issues in Large Vocabulary Continuous Speech Recognition (LVCSR)," Technical Report MSR-TR-2001-69, Microsoft Research China, 2001, retrieved from http://nlp.stanford.edu/pubs/p1304.pdf, 33 pages.

Liu, "Speaker Segmentation and Adaptation for Speech Recognition on Multiple-Speaker Audio Conference Data," Jul. 2-5 2007, Multimedia and Expo, 2007, retrieved from http://ieeexplore.ieee.org/xpls/abs_all.jsp?arnumber=4284619, abstract only.

Mimura et al., "Fast Speaker Normalization and Adaption based on BIC for Meeting Speech Recognition," PSIPA, 2011, retrieved from http://www.ar.media.kyoto-u.ac.jp/EN/bib/intl/MIM-APSIPA11.pdf, 4 pages.

Mirghafori et al., "From Switchboard to Meetings: Development of the 2004 ICSI-SRI-UW Meeting Recognition System," Proc. of InterSpeech, 2004, retrieved from http://www.icsi.berkeley.edu/ftp/global/pub/speech/papers/icslp2004-meeting-system.pdf, 4 pages.

Zax, "SIRI, Why Can't You Understand Me?" Fast Company, 2011, retrieved from http://www.fastcompany.com/1799374/siri-why-cant-you-understand-me, 6 pages.

Zheng et al., "Accent Detection and Speech Recognition for Shanghai-Accented Mandarin," University of Illinois, 2005, retrieved from http://stanford.edu/~jurafsky/p1304.pdf, 4 pages.

Official Action (with English translation) for Chinese Patent Application No. 20130462805.3 dated Jan. 28, 2016, 9 pages.

Official Action (with English translation) for Chinese Patent Application No. 20130462805.3 dated Sep. 28, 2016, 16 pages.

Official Action (with English translation) for Chinese Patent Application No. 20130462805.3 dated Mar. 31, 2017, 9 pages.

Official Action for European Patent Application No. 13187351.5, dated Dec. 8, 2015 5 pages.

Notice of Intention to Grant for European Patent Application No. 13187351.5, dated Dec. 12, 2016 7 pages.

Official Action for India Patent Application No. 3163/MUM/2013, dated Mar. 19, 2018 6 pages.

\* cited by examiner

PHRASE SPOTTING SYSTEMS AND METHODS

FIELD

Methods and systems for phrase spotting are provided.

BACKGROUND

In various applications, it is desirable to detect when a specific phrase has been spoken. However, current phrase spotting products can suffer from inaccurate phrase spotting. In addition, such products often do not provide the speaker with means to guide the system and improve its performance. In particular, the individual accents of speakers can adversely affect the accuracy of spotting specific phrases.

In order to improve the accuracy of phrase spotting systems, a training mode can be utilized. During training, a user is asked to provide speech samples in response to prompts. While such training can be effective at increasing the accuracy of speech to text systems for individual users, such training is time consuming. Additionally, when attempting to spot specific phrases spoken by an unknown or random speaker, traditional training as described above may prove to be impractical. In order to provide improved accuracy for a larger group of users such as callers into a contact center, individual users can be assigned to profile categories. For example, a user with an Australian accent can be associated with a profile that is intended to accurately spot phrases spoken with that accent.

In certain contexts, such as in contact centers, it can be desirable to monitor audio signals comprising speech for certain key words or phrases. For example, an enterprise might be interested in monitoring conversations between contact center agents and customers for certain words. As a particular example, a contact center server can monitor calls in real time for the word "supervisor." If that word is detected, it can be used as a trigger to a supervisor to intervene in the call, or to monitor the ongoing call. As another example, a financial institution may routinely record customer calls, so that an accurate record of customer instructions can be maintained. If a question later arises as to the content of a customer's earlier instructions, it can be desirable to search through the recordings made of earlier conversations between the customer and contact center agents, to locate and play back the earlier instructions. However, in such situations, there is little or no opportunity to train the system to accurately recognize the speech being monitored. Accordingly, previous techniques for training systems have been ineffective in these other contexts.

SUMMARY

Systems and methods that provide for improved phrase spotting accuracy in connection with word or phrase spotting are provided. More particularly, speech is monitored in real time for one or more words or phrases. When the system determines that a certain word or phrase has been uttered, a message can be displayed that asks for confirmation that the phrase identified by the system was in fact spoken. In response to confirmation that the specific phrase has been spoken, a copy of the phrase can be stored in a library of phrases and used to increase the accuracy of speech recognition with respect to the individual speaker, another user, or a group of users with some commonality.

In accordance with at least some embodiments of the present disclosure, an audio stream, for example, but not limited to a telephone conversation, is monitored by a monitor application. The monitor application listens to the audio stream for one or more specified phrases. As used herein, a phrase can include a phrase, word, phoneme, or other portion of speech. In response to a determination by the monitor application that a specified phrase has been identified, a hidden Markov model can be created. Additionally, verification from a user that the phrase was included in the audio stream is requested. This request for verification can be made to the user providing the speech. Moreover, the request for verification can be presented as a displayed message asking whether the specified phrase was in fact spoken by the user. If the user answers in the affirmative, the portion of the audio stream that includes the specified phrase can be stored. The stored phrase can then be used by the monitor application to identify future utterances of that phrase. The user who is asked to verify that a specific phrase has been spoken does not have to be the same person whose voice stream is monitored.

Systems implementing embodiments of the present disclosure can provide a communication server that executes a monitor application. The monitor application can be provisioned by an administrator or supervisor to monitor one or more audio streams for a specified phrase. The monitor application then operates to "listen" to voice communications for the one or more specified phrases. In response to determining that a specified phrase has been uttered, the monitor application requests confirmation from a human listener or participant who may be an agent or supervisor user that a specified phrase has in fact been uttered. The request may also include presenting text to a contact center customer user stating the phrase has been identified by the monitor application, and further requesting acknowledgement from the customer user. In additional embodiments, the user may be one or more users and may have different relationships that the ones used above. In response to input confirming the presence of the specified phrase in the audio stream, the monitor application can store the portion of the audio stream that includes the specified phrase. The stored phrase can then be used to identify subsequent utterances of that phrase. By thus providing an actual example of the customer user's utterance of the specified phrase, that phrase can be identified with greater accuracy in future voice communications from that customer user or from other customer users with a similar accent or speech pattern. Alternatively, if the agent or customer user indicates that the specified phrase was not uttered, the monitor application can continue to use the standard text file applied to users generally. Additionally, the voice segment which was mistakenly identified as containing the specific phrase may be stored for future reference and used to reduce future false detection of the specific phrase. In accordance with further embodiments of the present disclosure, a library of specified phrases can be developed for individual users or classes of users with similar accent or speech patterns. Moreover, the library can be parsed into a library of phonemes that can be used to identify specified phrases included in or comprising words or phrases other than those for which samples have been obtained. Similarly, the system provides users with the ability to alert the system whenever the user determines that a specific phrase has been uttered and the system has not spotted it. When this occurs, the system may store the relevant voice stream segment for future reference in a manner similar to the one described above.

Additional features and advantages of embodiments of the present invention will become more readily apparent from the following description, particularly when taken together with the accompanying drawings.

DETAILED DESCRIPTION

Figure 1:
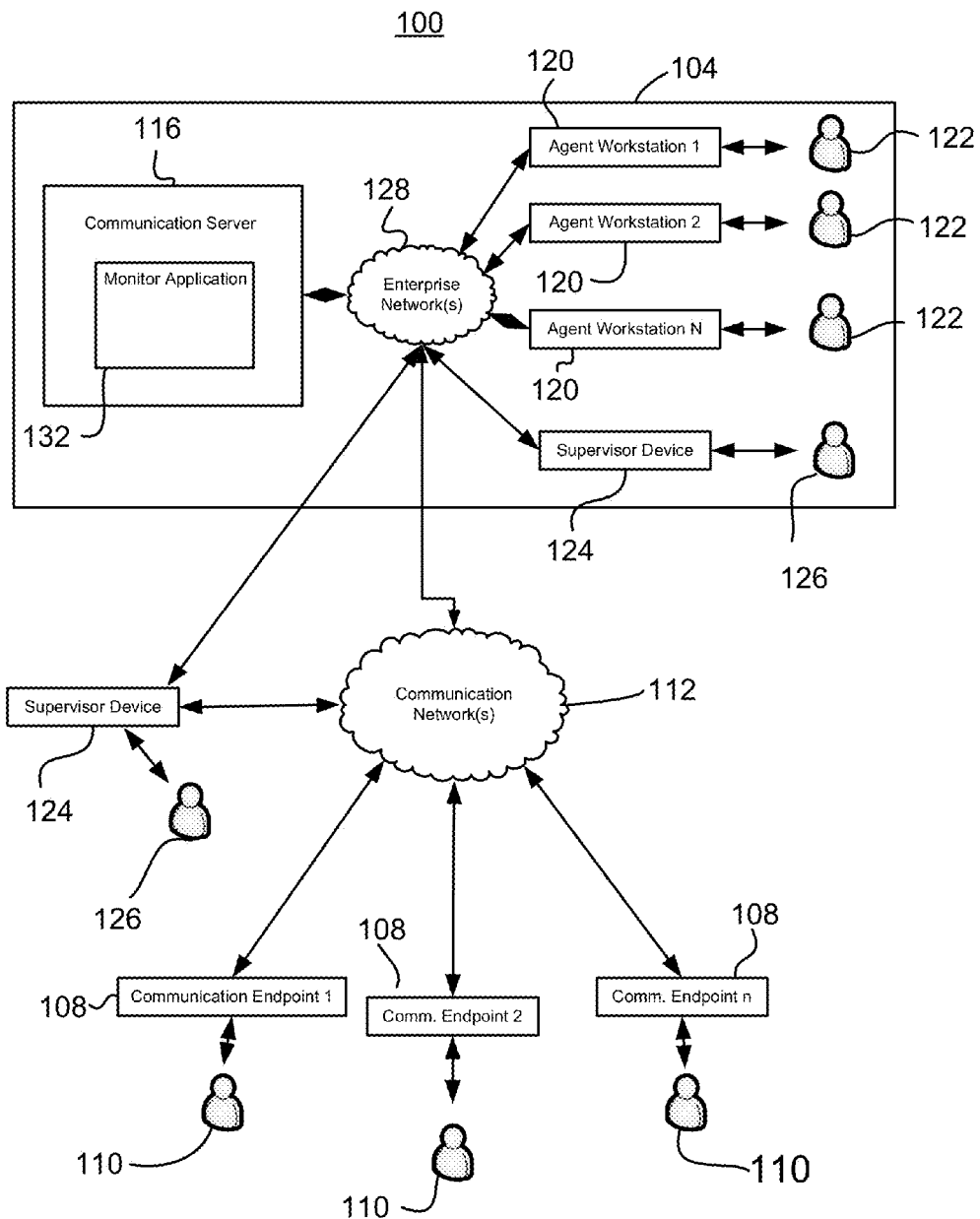
FIG. 1 is a block diagram depicting components of a system in accordance with embodiments of the present disclosure.

FIG. 1 is a block diagram depicting components of a communication system 100 in accordance with embodiments of the present invention. In this example, the communication system 100 includes a contact center 104. In general, the contact center 104 can be in communication with one or more communication endpoints or devices 108 via one or more communication networks 112. Examples of communication endpoints 108 include but are not limited to smartphones, cellular telephones, desktop telephones, desktop computers, laptop computers, thin client devices, tablet computers, or any other device capable of supporting communications, including but not limited to voice communications, between a user 110 (e.g., a customer) and a human user or automated agent user 122 associated with the contact center 104. In accordance with further embodiments, a communication endpoint 108 can exchange non-voice data between a customer user 110 and the contact center 104 or other components or endpoints. Accordingly, a communication endpoint 108 can include various user output and user input devices or facilities, including but not limited to speakers, microphones, text displays, display screens, video cameras, keypads, keyboards, porting devices, and touch screen displays. The communication network 112 can include the Internet, a local area network (LAN), wide area network (WAN), public switched telephone network (PSTN), wireless networks, cellular telephony networks, satellite telephony networks, virtual or cloud networks, remote or off-premise networks, or a plurality of networks in any combination.

The contact center 104 generally includes a communication server 116. The communication server 116 can include (or be attached to) an automatic contact (or call) distribution system (ACD) server. The communication server 116 is illustratively the Communication Manager™ enterprise communication-based ACD system available from Avaya, Inc. The communication server 116 is interconnected to a plurality of agent workstations or endpoints 120. For example, the agent workstations 120 may be connected to the ACD server 116 by an enterprise network or networks 128. As examples, the agent workstations 120 can comprise general purpose computers, telephones, thin client devices, or other devices, that are operable to place an associated agent 120 in voice communication with a customer user 110 of a communication endpoint 108. As further examples, an agent workstation 120 can comprise an automated resource, such as an interactive voice response (IVR) system or server. In accordance with another example embodiment, an agent workstation 120 can comprise an automated resource, such as a virtual assistant (also known as a virtual agent or automated chat agent).

The communication server 116 generally functions to connect agent workstations 120 to communication devices or endpoints 108 through the communication network 112, to allow the agent users 122 to service customer 110 contacts. In accordance with embodiments of the present disclosure, the contacts comprise voice communications. For example, contacts can be in the form of voice telephony communications. As can be appreciated by one of skill in the art after consideration of the present disclosure, the communication server 116 can maintain one or more queues for organizing and maintaining or holding contacts waiting for handling by a contact center agent user 122. For example, a single queue or plurality of queues can be provided to sort contacts according to various parameters. Agent users 122, automated attendants, or other resources associated with or provided by the agent workstations 120 are assigned to provide services to contacts that have been placed within one or more of the queues based on availability and/or weighting factors. In addition to supporting voice communications, the workstations 120 can include a user output in the form of a display and a user input in the form of a keypad, keyboard, touch screen input, pointing devices, video cameras, or the like.

In addition, embodiments of a system 100 as described herein can include one or more supervisor or administrator devices 124. The supervisor device 124 is generally in communication with the communication server 116 via the communication network 112 and/or the enterprise network 128. For example, if the supervisor device 124 is on the premises of the contact center 104, communications with the communication server 116 may be over a portion of the enterprise network 128 comprising a wireline or wireless network. As another example, the supervisor device 124 may be in communication with the communication server 116 over the communication network 112, for example via a cellular telephony data network, a wired or wireless connection outside of the enterprise network 128, or the like. In general, the supervisor device 124 comprises functionality that allows a supervisor user 126 to monitor communications between a communication device 108 and the contact center 104, to join in-process communications, to initiate communications, and to control aspects of the operation of the contact center 104. Accordingly, the supervisor device 124 can comprise any device, including a mobile device, capable of presenting information to a supervisor user 126. Examples of the supervisor device 124 include, but are not limited to, a telephone, a tablet computer, a smartphone, a laptop computer, a desktop computer, a netbook, or the like. A supervisor may use one or more supervisor devices 124 to monitor communications.

Figure 2:
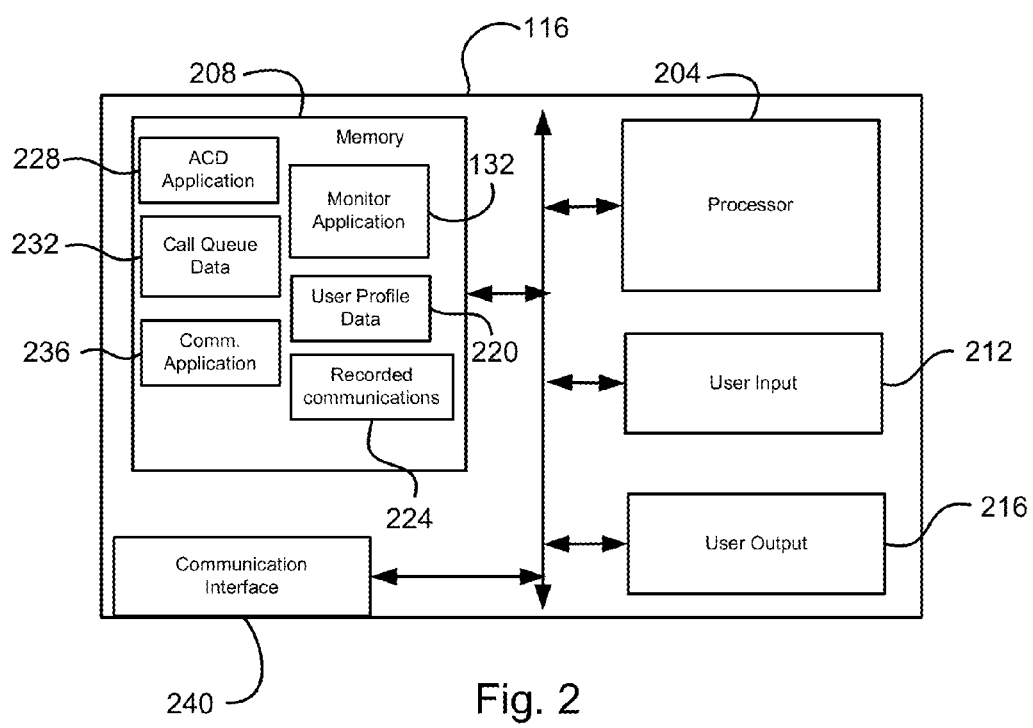
FIG. 2 is a block diagram of a communication server in accordance with embodiments of the present disclosure.

FIG. 2 is a block diagram depicting components of a communication server 116 in accordance with embodiments of the present disclosure. The communication server 116 includes a processor 204 capable of executing program instructions. The processor 204 can include any general purpose programmable processor or controller for executing application programming. Alternatively, the processor 204 may comprise a specially configured application specific integrated circuit (ASIC). The processor 204 generally functions to run programming code implementing various functions performed by the communication server 116. For example, the processor 204 can implement functions including but not limited to monitoring in-process or recorded audio streams for specified phrases through execution of a monitor application 132 as described herein.

The communication server 116 additionally includes memory 208. The memory 208 can be used in connection with the execution of programming by the processor 204 of the communication server 116, and for the temporary or long term storage of data and/or program instructions. In accordance with embodiments of the present disclosure, the monitor application 132 may be stored on and executed in connection with the memory 208 of the communication server 116. As a further example, the memory 208 can store user profile data 220, and recorded voice communications 224. As still other examples, the communication server 116 can include the automatic call distribution (ACD) application 228, call queue data 232, and one or more communication applications 236 such as chat, co-browsing, etc. The memory 208 of the communication server 116 can include solid state memory that is resident, removable and/or remote in nature, such as DRAM and SDRAM. Moreover, the memory 208 can include a plurality of discrete components of different types and/or a plurality of logical partitions. The memory 208 can also include or be associated with a database or storage system that is integrated with or separate from but interconnected to the communication server 116. In accordance with still other embodiments, the memory 208 comprises a non-transitory computer readable storage medium. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read.

In addition, user input devices 212 and user output devices 216 may be provided. With respect to the communication server 116, such devices 212 and 216 can be used in connection with the monitoring and control of the contact center 104 and associated communications by a supervisor user 126 and/or an agent user 122. However, a supervisor user 126 or agent user 122 typically interfaces with the communication server 116 through a supervisor device 124 or agent workstation 120, where the supervisor device 124 or agent workstation 120 each are associated with one or more user inputs and one or more user outputs. Examples of user input devices 212 include a keyboard, a numeric keypad, a touch screen, a microphone, mouse, video camera, scanner, and pointing device combined with a screen or other position encoder. Examples of user output devices 216 include a display, a touch screen display, a speaker, and a printer. The communication server 116 also generally includes a communication interface 240 to interconnect the communication server 116 to the networks 112 and/or 128.

Figure 3:
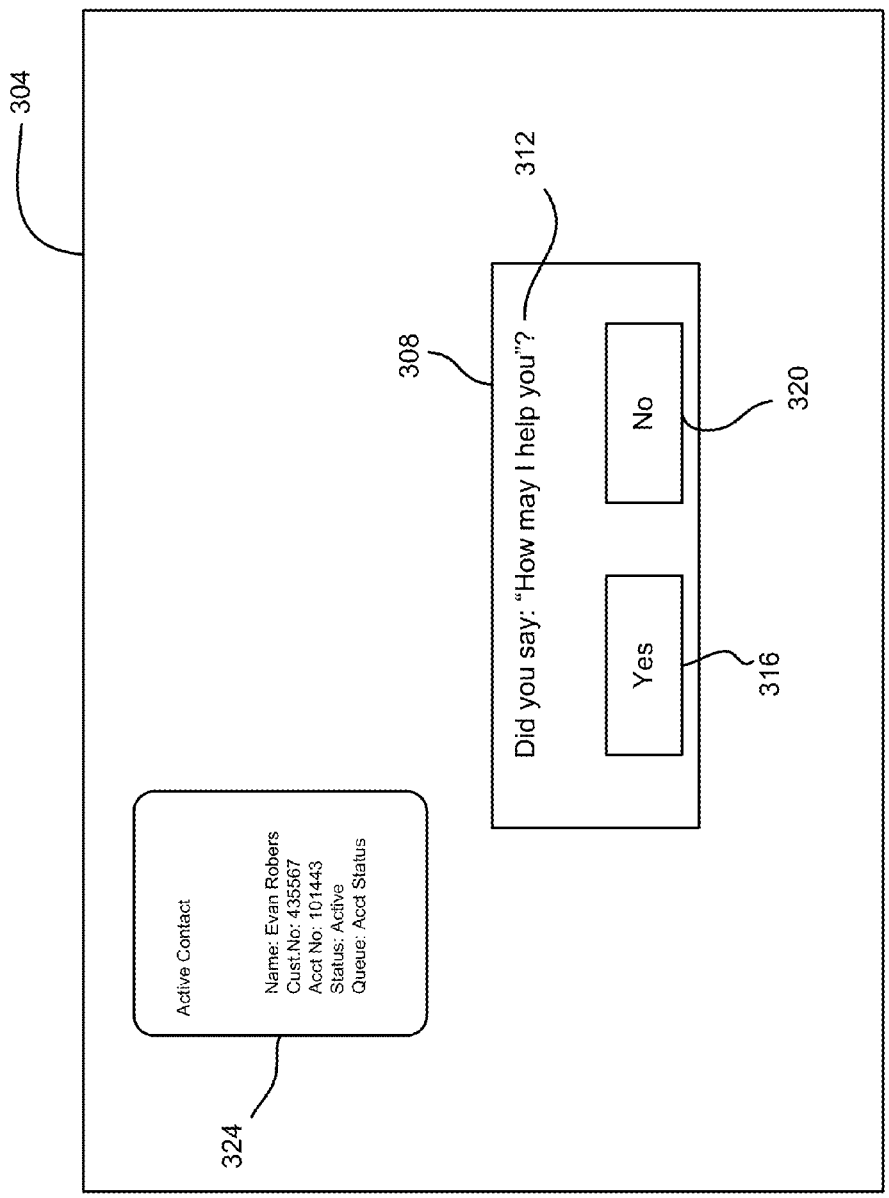
FIG. 3 depicts a user interface in accordance with embodiments of the present disclosure.

FIG. 3 depicts a user interface 304 in accordance with embodiments of the present disclosure. The user interface 304 can be provided by or in connection with a user output device (e.g., a display) of a communication endpoint 108, an agent workstation 120, and/or supervisor device 124. The user interface 304 can be generated through or in connection with the operation of the monitor application 132 running on the communication server 116, and/or in connection with a companion application, such as a specially provided application and/or a browser application, provided as part of a communication endpoint 108, an agent workstation 120, or supervisor device 124. Accordingly, the user interface 304 is generally presented to a customer user 110, an agent user 122, and/or a supervisor user 126. Moreover, the user interface 304 can be interactive in that it can provide fields, buttons, menus, or other features to enable the user interface 304 to receive input from a customer user 110, an agent user 122, or a supervisor user 126, as well as to present information to the customer user 110, agent user 122, or supervisor user 126 graphically, by means of an audio signal, or through any other suitable means.

The user interface 304 can operate to present a query to a customer user 110, an agent user 122, or a supervisor user 126 regarding whether a specified phrase has been voiced in a speech confirmation area 308. In the example query shown in the figure, the question 312 "Did you say: 'How may I help you'?" is presented in the query area 308. This is an example of a query 312 that might be presented to an agent user 122 in response to the monitor application 132 monitoring for the specified phrase "how may I help you". The query area 308 can additional include input buttons, including a yes button 316 and a no button 320. Accordingly, the agent user 122 may confirm that the specified phrase was in fact voiced by clicking the yes button 316. Alternatively, the agent user 122 can indicate that the specified phrase has not been voiced by clicking the no button 320. In accordance with still other embodiments, similar queries 312 can be presented to a customer user 110 and/or a supervisor user 126, as described in greater detail elsewhere herein. Continuing the example of a user interface 304 that is presented to an agent user 122, active contact information 324 can also be presented. Such active contact information 324 can include the name of a customer user 110, and other information about the customer user 110 that may be available to the contact center 104. In addition, a user interface 304 can present other controls, for example controls typically provided as part of a soft phone application, and controls that allow access to other communication applications 236, such as but not limited to email, text messaging, instant messaging, or the like. Accordingly, the user interface 304 allows the monitor application 132 to collect feedback from a participant in or an observer of a communication, regarding whether a specified word or phrase has been voiced. In general, any participant, whether a user, agent, supervisor, etc., may be asked to acknowledge that a specific phrase was uttered by other participants.

Figure 4:
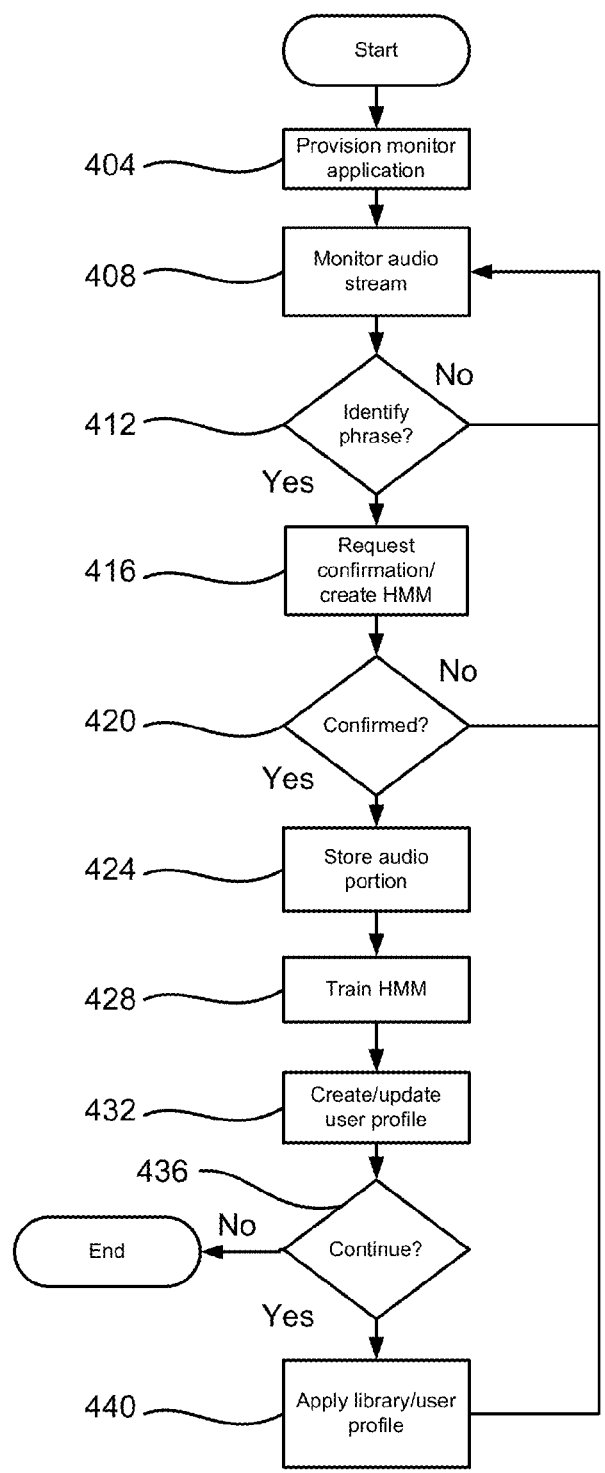
FIG. 4 is a flowchart depicting aspects of a method in accordance with embodiments of the present disclosure.

With reference now to FIG. 4, aspects of a method for monitoring an audio stream for a specified phrase are depicted. Generally, the method begins with a step of provisioning a monitor application 132, in step 404. This includes specifying one or more spoken phrases that the monitor application is to listen for. A given phrase can be specified by a system administrator or supervisor user 126 as a text string. As used herein, a phrase can include a single word or multiple words. In actual use, a system 100 is configured to monitor for a specified phrase that acts as a trigger for an event, or that is otherwise significant. In addition, monitoring of audio streams is often desirable in connection with the operation of a contact center 104, although embodiments can be applied in different contexts. As examples, the detection of specific phrases within an audio stream can be used to identify when intervention in a communication session by a supervisor user 126 is desirable, to ensure that customer service guidelines are being met by agent users 122, or to identify instructions received from a customer user 110.

At step 408, an audio stream is monitored. As used herein, an audio stream can be received by a communication server 116 running the monitor module or application 132 as part of a voice telephony session between a customer user 110 and resource associated with the communication server 116, such as a human agent user 122, or an automated agent. Accordingly, an audio stream can include a real time voice communication session. In accordance with still other embodiments, the audio stream can include a recorded audio stream.

A determination can then be made as to whether a specified phrase has been identified within the monitored audio stream, in step 412. In accordance with a specific example implementation, the occurrence of a specified phrase is, at least in an initial instance, determined by comparing a file representing the sound profile of the specified phrase that is generated from a text to speech facility of the monitor application 132 to the sound profile of the monitored audio stream. Moreover, identification of a phrase is determined probabilistically. For example, the monitor application 132 can determine that a phrase is included in a monitored audio stream if it concludes with some minimum degree of certainty that the phrase was in fact uttered. Until a specified phrase has been identified, the monitor application 132 can continue to monitor the audio stream.

The monitor application may be based on sub-word hidden Markov models (HMMs), which are a sophisticated way of averaging multiple phrases to obtain a robust pattern to match. When a specified phrase has been identified, a new model may be constructed in step 416. Additional HMMs may be built for each word or phrase later in the method using an associated training set (in step 432). In response to a determination that the specified phrase has been identified, a request for confirmation that the specified phrase was in fact included in the audio stream is generated, in step 416. For example, the monitor application can operate to cause a user interface 304 to display a request for verification that is presented to a user, such as a customer user 110 comprising a customer or other third party, an agent user 122, or a supervisor user 126, as text. Typically, the request for verification is sent to the user who provided the portion of the audio stream in which the monitor application 132 identified the phrase. However, in other embodiments, a human listener other than the user who provided the portion of the audio stream in which the phrase was identified can be queried for verification.

At step 420, a determination is made as to whether confirmation that the audio stream included the phrase has been received from a user. For example, where a query regarding the occurrence of a specified phrase is presented to a user through a user interface 304, the user can confirm the utterance of the phrase by clicking a "yes" button 316. If user confirmation has not been received, the process can return to step 408, and the audio stream can continue to be monitored. If user confirmation has been received, an audio portion that included the phrase may be stored, in step 424.

HMMs may correspond to any level of representation of the speech: phoneme, word, phrase, etc., and may be concatenated to construct a higher level model. A dynamic algorithm may be structured to determine and record an optimum alignment of frames from the phrase to the corresponding HMM. The HMM can be trained using a variety of methods. For example, a canonical approach uses "maximum likelihood" to train the HMM, and "discriminative training" takes close mismatches into account during training, in step 428. In response to receiving confirmation that the specified phrase was uttered in the monitored audio stream, a profile for the user that provided the phrase can be created or updated, in step 432. Creating or updating the user profile can include storing a portion of the audio stream containing the phrase as user profile data 220. As can be appreciated by one of skill in the art after consideration of the present disclosure, the portion of the audio stream can be stored as a representation of the audible signal. For example, the portion of the audio stream can be stored as a .wav file, mp3 file, or other format. Moreover, storing the portion of the audio stream can include parsing in order to separate different phrases, words, and/or phonemes from one another. In addition, the audio file can be filtered or otherwise processed as part of creating or updating the user profile. Additional HMMs may be created and stored in the library.

In a preferred embodiment, the segment of the media stream containing the phrase or the speech parameters extracted from the segment of the media stream are stored and utilized to spot the phrase in the media stream of the same speaker or alternatively in media streams originating from other speakers. In this aspect, the segment of the media stream or the associated speech parameters are used in conjunction with the text that specifies the phrase the system attempts to spot. As the library of media stream segments or its corresponding parameters increase, the system may discontinue the use of the text which identifies the desired phrase and switch to using the specific media stream segment or its associated parameters. The library associated with each phrase may be constructed from phrases originating from multiple users over time, which may provide improved phrase spotting for a variety of users who may speak with different accents.

At step 436, a determination can be made as to whether operation of the monitor application 132 should be continued. If operation is not to be continued, the process can end. If operation is to continue, the created or updated user profile data 220 and/or the updated phrase library/profile can be applied, in step 440. The process can then return to step 408, and the audio stream can continue to be monitored with improved phrase recognition accuracy, since the continued monitoring uses the created or updated user profile data 220 and/or the updated phrase library/profile. As can be appreciated by one of skill in the art after consideration of the present disclosure, the user profile data 220 for a particular user and/or the updated phrase library/profile can be applied during the continuation of the communication session that resulted in the creation of or update to the user profile data 220 for that user and/or the updated phrase library/profile. Alternatively or in addition, user profile data 220 generated in connection with an earlier communication session and/or the updated phrase library/profile can be applied in connection with a later communication session with the same user or with other users. In accordance with still other embodiments, user profile data 220 generated in connection with a later communication session can be applied to an earlier, recorded communication session. For example, where a later communication session references an earlier communication session for which a recording 224 is available, a sample of a phrase obtained from a customer user 110 during the later communication session can be used to more accurately identify the recorded communication session, and/or the portion of a recorded communication session in which the phrase was uttered.

Embodiments of the present disclosure provided systems and methods to improve the accuracy of word or phrase spotting systems. Although various examples have been discussed that relate to use in connection with contact centers, other applications are possible. For example, systems and methods as disclosed herein can be used to train any system for identifying phrases in any real time or recorded speech.

For simplicity of explanation, the notion of storing (and using) media string segments representing specific phrases may be used interchangeably with the notion of storing speech parameters associated with the media stream segments.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for recognizing speech, comprising:
   receiving, by a processor, a first phrase;
   receiving, by the processor, a first audio stream of a first communication session comprising speech from at least a first user and a second user and wherein the at least first and second users are each contributing speech during the first communication session;
   analyzing, by the processor, the first audio stream and based on the analysis determining, with at least a first probability, that the first phrase was spoken in the first communication session;
   upon the determining, by the processor, that the first phrase was spoken in the first communication session:
      for each of a plurality of utterances of the first phase, submitting, by the processor, a request for verification from one of the at least first and second users that the first phrase was spoken by one of the at least first and second users in the first communication session; and
      in response to the processor receiving verification from the request confirming that the first phrase was spoken in the first communication session and further receiving, by the processor, identification of a speaking user, storing in a memory, by the processor, both (a) a first portion of the first audio stream that includes the first phrase and (b) a corresponding indicia of the speaking user identified as speaking the first phrase and at least one of creating, by the processor, a corresponding average of multiple instances of spoken content in the first phrase for the speaking user identified as speaking the first phrase or updating, by the processor, the corresponding average of multiple instances of the spoken content using the first portion of the first audio stream that includes the first phrase; and
      for any subsequent utterance of the first phrase utilizing, by the processor, the corresponding created or updated average of multiple instances of the spoken content for the identified speaking user and a comparison of the received subsequent utterance of the first phrase to both (a) the first portion of the first audio stream that includes the first phrase stored in the memory and (b) the corresponding indicia of the speaking user stored in the memory, and thereby improve an accuracy of speech recognition with respect to the speaking user speaking the first phrase.

2. The method of claim 1, wherein the first audio stream is provided by the first user and wherein the spoken content is a word in the first phrase.

3. The method of claim 1, wherein the spoken content is a plurality of words in the first phrase and further comprising:
   receiving, by the processor, a second audio stream of a second communication session comprising speech from at least the first user;
   accessing, by the processor, the first portion stored in memory; and
   comparing, by the processor, the first portion with a second portion of the second audio stream to determine whether the second portion matches the first portion.

4. The method of claim 3, wherein the second communication session is a subsequent portion of the first communication session.

5. The method of claim 3, further comprising:
   receiving, by the processor, a second phrase;
   determining, by the processor, with at least the first probability that the second phrase has been spoken in at least one of the first and second communication sessions; and
   requesting, by the processor, verification from one of the at least first and second users that the second phrase was spoken in one of the first and second communication sessions.

6. The method of claim 1, wherein the spoken content is the first phrase and wherein the verification is received from the second user.

7. The method of claim 3, wherein the verification is received from the second user.

8. The method of claim 1, wherein the spoken content comprises a word inthe first phrase and wherein the first audio stream is a real-time audio stream.

9. The method of claim 1, wherein the spoken content comprises plural words in the first phrase and wherein the first audio stream is a recorded audio stream.

10. The method of claim 1, wherein the spoken content comprises a word in a first phrase and further comprising:
    receiving, by the processor, a second phrase;
    receiving, by the processor, a second audio stream, of a second communication session comprising speech from at least the first user; and
    analyzing, by the processor, the second audio stream and based on the analysis comprising a comparison of (a) the second phrase to the first phrase stored in the memory and (b) the corresponding indicia of the speaking user stored in the memory, and determining, by the processor, with at least the first probability that the second phrase was spoken in the second audio stream by the speaking user.

11. The method of claim 10, wherein the first phrase is at least one of a first phrase-portion and a first word, wherein the second phrase is at least one of a second phrase-portion and a second word, and wherein at least a first phoneme of the first phrase-portion is used in the comparison to determine a match between the first phrase and the second phrase.

12. The method of claim 10, wherein the corresponding average of multiple instances of the spoken content is a hidden Markov model and further comprising:
    requesting, by the processor, verification from the at least one of the first and second user that the second phrase was spoken in the second communication session; and in response to receiving verification that the second phrase was spoken in the second communication session and receiving, by the processor, identification of a second speaking user, comprising the one of the first user and the second user associated with speaking the second phrase, storing in the memory by the processor, both (a) a second portion of the second audio stream that includes the second phrase and indicia of the second speaking user (b) a corresponding indicia of the second speaking user identified as speaking the second phrase and, at least one of, creating, by the processor, a corresponding hidden Markov model for the second speaking user identified as speaking the second phrase or updating, by the processor, the corresponding hidden Markov model using the second portion of the second audio stream that includes the second phrase.

13. The method of claim 1, wherein the spoken content comprises plural words in the first phrase and further comprising:
upon determining, by the processor, from the received first audio stream that the first user has a first determined speech characteristic, applying, by the processor, an entry in a voice recognition library associating the first portion with the first phrase for the first user.

14. A system comprising:
means to receive by a processor and store in a memory a first text string specifying a first phrase;
means to monitor, by the processor, a first audio stream, of a first communication session comprising speech from at least a first user and a second user and wherein the at least first and second users are each contributing speech during the first communication session;
means to analyze the first audio stream and determine with at least a first probability that the first phrase was spoken in the first communication session;
means to, in response to the processor determining that the first phrase was spoken in the first communication session:
for each of a plurality of utterances of the first phrase, request, by the processor, verification from one of the at least first and second users that the first phrase was spoken by one of the at least first and second users in the first communication session and;
in response to receiving verification that the first phrase was spoken in the first communication session and further receiving, by the processor, identification of a speaking user, store in a memory, by the processor, both (a) a portion of the first audio stream that includes the first phrase and (b) a corresponding indicia of the speaking user identified as speaking the first phrase and at least one of creating, by the processor, a corresponding average of multiple instances of spoken content for the speaking user identified as speaking the first phrase or updating, by the processor, the corresponding average of multiple instances of spoken content using the first portion of the first audio stream that includes the first phrase; and
for any subsequent utterance of the first phrase, means to utilize, by the processor, the average of multiple instances of spoken content for the identified speaking user and a comparison of the received subsequent utterance of the first phrase to both (a) the first portion of the first audio stream that includes the first phrase stored in the memory and (b) the corresponding indicia of the speaking user stored in the memory, and thereby improve an accuracy of speech recognition with respect to the speaking user speaking the first phrase.

15. The system of claim 14, wherein the spoken content comprises a word in the first phrase and wherein the corresponding average of multiple instances of spoken content is a hidden Markov model and further comprising:
means to receive, by the processor, and store in the memory a second text string specifying a second phrase;
means monitor, by the processor, a second audio stream of a second communication session comprising speech from at least a first user and a second user; and
means to determine, by the processor, whether the second phrase was spoken in the second communication session, wherein the means to determine whether the second phrase was spoken in the second communication session includes comparing, by the processor, (a) the second phrase to the first phrase stored in the memory and (b) the corresponding indicia of the speaking user, retrieved from the memory, and determine, with at least the first probability that the second phrase was spoken in the second audio stream by the speaking user.

16. The system of claim 15, wherein the spoken content comprises a plurality of words in the first phrase and wherein the first audio stream and the second audio stream include speech provided by the first user.

17. The system of claim 16, wherein the spoken content is the first phrase, wherein the means to determine whether the first phrase was spoken in the first communication session includes means to apply, by the processor, a text-to-speech facility to the text string specifying the first phrase to obtain an audio profile for the first phrase, wherein the audio profile for the first phrase is compared, by the processor, to the first audio stream to determine whether the first phrase was spoken in the first communication session, wherein the stored portion of the first audio stream is retrieved from the memory by the processor and compared to the second audio stream to determine whether the second phrase was spoken in the second communication session.

18. A computer system for detecting speech, comprising:
a communication server, including:
a communication interface;
a memory;
a processor, wherein a monitor application stored in the memory and executed by the processor is operable to:
analyze an audio stream received through the communication interface, the audio stream comprising a communication session comprising speech from at least a first user and a second user and wherein the at least first and second users are each contributing speech during the communication session;
in response to detecting a first phrase being spoken in the communication session:
for each of a plurality of utterances of the phrase, request verification from one of the at least first and second users that the first phrase was spoken by one of the at least first and second users in the communication session; and
in response to receiving verification that the phrase was included in the communication session and further receiving identification of a speaking user, storing in a memory both (a) a portion of the audio stream that includes the first phrase and (b) a corresponding indicia of the speaking user identified as speaking the first phrase and at least one of creating, by the processor, a corresponding average of multiple instances of spoken content for the speaking user identified as speaking the first phrase or updating, by the processor, the corresponding average of multiple instances of spoken content using the portion of the audio stream that includes the first phrase; and for any subsequent utterance of the first phrase utilizing, by the processor, the corresponding created or updated average of multiple instances of spoken content for the identified speaking user and a comparison of the received subsequent utterance of the first phrase to both (a) the portion of the audio stream that includes the first phrase stored in the memory and (b) the corresponding indicia of the speaking user each stored in the memory, and thereby improve an accuracy of speech recognition with respect to the first speaking user speaking the first phrase.

19. The system of claim 18, wherein the spoken content comprises a word in the first phrase and wherein the corresponding average of instances of spoken content is a hidden Markov model and further comprising:
a network; and
a communication endpoint, wherein the communication endpoint is interconnected to the communication server by the network, and wherein the audio stream is provided to the communication server by the communication endpoint.

20. The system of claim 19, wherein the spoken content comprises plural words in the first phrase, wherein the first and second users are associated with the communication endpoint, wherein the communication endpoint includes a display and a user input, wherein the request for verification is presented to the first and second users through the display of the communication endpoint, and wherein verification from the first and second users is entered by input to the communication endpoint.

\* \* \* \* \*

UNITED STATES PATENT AND TRADEMARK OFFICE
CERTIFICATE OF CORRECTION

PATENT NO. : 10,229,676 B2  
APPLICATION NO. : 13/646303  
DATED : March 12, 2019  
INVENTOR(S) : Shmuel Shaffer, Keith Ponting and Valentine C. Matula Page 1 of 1

It is certified that error appears in the above-identified patent and that said Letters Patent is hereby corrected as shown below:

In the Specification

At Column 10, Line 37, please delete "inthe" and insert --in the-- therein.

At Column 10, Line 43, after the phrase "comprises a word in" delete "a" and replace it with --the-- therein.

At Column 11, Line 42, after the phrase "at least" insert --one of the-- therein.

At Column 11, Line 43, after the phrase "spoken by" delete "one of" therein.

At Column 12, Line 55, delete "first" therein.

At Column 12, Line 56, after the word "session" delete ":" and replace it with --;-- therein.

At Column 12, Line 59, delete the word "first".

At Column 12, Line 66, delete the word "first".

At Column 13, Line 5, delete the word "first".

At Column 13, Line 9, delete the word "first".

At Column 13, Line 14, delete the word "first".

At Column 13, Line 15, delete the word "first".

At Column 13, Line 20, delete the word "first".

Signed and Sealed this  
Seventh Day of May, 2019

Andrei Iancu  
*Director of the United States Patent and Trademark Office*